US007024826B2

(12) United States Patent
Roberts et al.

(10) Patent No.: US 7,024,826 B2
(45) Date of Patent: *Apr. 11, 2006

(54) DEVICE FOR IMPEDING A ROUTE OF TRAVEL OF CRAWLING ARTHROPODS

(75) Inventors: Ernest H. Roberts, Davis, CA (US); Philip G. Koehler, Gainesville, FL (US); Richard Patterson, Gainesville, FL (US)

(73) Assignee: University of Florida, Gainesville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/619,324

(22) Filed: Jul. 14, 2003

(65) Prior Publication Data

US 2004/0006931 A1 Jan. 15, 2004

Related U.S. Application Data

(62) Division of application No. 09/750,831, filed on Dec. 28, 2000, now Pat. No. 6,837,008.

(60) Provisional application No. 60/181,395, filed on Feb. 9, 2000.

(51) Int. Cl.
*E04B 1/72* (2006.01)

(52) U.S. Cl. .......................................... 52/101; 43/131

(58) Field of Classification Search ................. 52/101; 43/107, 121, 131, 132.1; 239/275, 276
See application file for complete search history.

(56) References Cited

U.S. PATENT DOCUMENTS

| 135,655 | A | 2/1873 | Miller et al. |
| 223,321 | A | 1/1880 | Denton |
| 459,089 | A | 9/1891 | Muller |
| 519,811 | A | 5/1894 | Gerard |
| 672,958 | A | 4/1901 | McElligott |
| 898,852 | A | 9/1908 | Duggan |
| 948,014 | A | 2/1910 | Lewis |
| 1,068,258 | A | 7/1913 | McCombs |
| 1,242,680 | A | 10/1917 | Goedeke |
| 1,248,283 | A | 11/1917 | Derck |

(Continued)

FOREIGN PATENT DOCUMENTS

DE  43 21 5110 A1  3/1994

(Continued)

OTHER PUBLICATIONS

Hawley's Condensed Chemical Dictionary, Lewis, Richard J. Sr., 1997, John Wiley & Sons, 13, 942.*

*Primary Examiner*—Naoko Slack
(74) *Attorney, Agent, or Firm*—Brian S. Steinberger; Law Offices of Brian S. Steinberger, P.A.

(57) ABSTRACT

A barrier implement intended for obstructing a route of travel of crawling arthropods along a passageway comprises a sheet configured to circumscribe a passageway along which arthropods crawl. A dimension of the sheet is sized or molded relative to said passageway. An arthropod deterring component associated with said sheet for deterring said crawling arthropods and impeding their route of travel along said passageway.

In a method of impeding a route of travel of crawling arthropods from moving along a passageway from a location A to a location B, an arthropod deterring component is associated with a sheet. The sheet separates location A from location B and creates a vermin-impervious barrier therebetween. A route of travel of crawling arthropods from moving from location A to location B is impeded.

13 Claims, 6 Drawing Sheets

U.S. PATENT DOCUMENTS

| | | | | |
|---|---|---|---|---|
| 1,251,786 | A | 1/1918 | Kirfman | |
| 1,279,865 | A | 9/1918 | Hendershot et al. | |
| 1,305,547 | A | 6/1919 | Joseph | |
| 1,305,553 | A | 6/1919 | Kruse | |
| 1,325,316 | A | 12/1919 | Diss | |
| 1,389,572 | A | 9/1921 | Berg | |
| 1,390,734 | A | 9/1921 | Stevens | |
| 1,402,998 | A | 1/1922 | Anderson | |
| 1,405,822 | A | 2/1922 | Erickson | |
| 1,480,758 | A | 1/1924 | Hight | |
| 1,554,327 | A | 9/1925 | Boberg | |
| 1,581,410 | A | 4/1926 | Welsh | |
| 1,641,127 | A | 8/1927 | Denslow | |
| 1,745,905 | A | 2/1930 | Oakman | |
| 1,800,613 | A | 4/1931 | Farrell | |
| 1,814,471 | A | 7/1931 | Grove | |
| 1,861,095 | A | 5/1932 | Schacht | |
| 1,990,049 | A | 2/1935 | Perry | |
| 2,018,264 | A | 10/1935 | Jones | |
| 2,063,768 | A | 12/1936 | Staffel | |
| 2,108,036 | A | 2/1938 | Gowell | |
| 2,143,043 | A | 1/1939 | Wexler | |
| 2,356,022 | A | 8/1944 | Wright | |
| 2,389,870 | A | 11/1945 | Reevely | |
| 2,457,723 | A | 12/1948 | Pura | |
| 2,502,759 | A | 4/1950 | Singer | |
| 2,535,209 | A | 12/1950 | Hubert | |
| 2,593,781 | A | 4/1952 | Meis | |
| 2,719,061 | A | 9/1955 | Beatty | |
| 2,746,201 | A | 5/1956 | Warrel | |
| 2,936,926 | A | 5/1960 | Miller | |
| 2,973,148 | A * | 2/1961 | Franz | 239/230 |
| 3,150,853 | A | 9/1964 | Lisbin | |
| 3,333,361 | A * | 8/1967 | Manak | 47/58.1 R |
| 3,361,364 | A * | 1/1968 | Purtell | 239/288.5 |
| 3,438,342 | A | 4/1969 | Woolworth et al. | |
| 3,505,724 | A | 4/1970 | Leitner et al. | |
| 3,705,938 | A | 12/1972 | Hyman | |
| 3,851,601 | A | 12/1974 | Davis | |
| 3,857,934 | A | 12/1974 | Bernstein | |
| 3,864,468 | A | 2/1975 | Hyman | |
| 3,995,595 | A | 12/1976 | Williams | |
| 4,101,232 | A | 7/1978 | Haapala | |
| 4,102,991 | A | 7/1978 | Kydonieus | |
| 4,124,198 | A | 11/1978 | Wong | |
| 4,267,781 | A | 5/1981 | Powers | |
| 4,399,772 | A | 8/1983 | Salinas | |
| 4,400,909 | A | 8/1983 | Reese | |
| 4,576,801 | A | 3/1986 | Parry | |
| 4,766,695 | A | 8/1988 | Harlow | |
| 4,871,541 | A | 10/1989 | Shibanai | |
| 4,877,617 | A | 10/1989 | Namikoshi | |
| 4,890,416 | A | 1/1990 | Roberts | |
| 4,908,980 | A | 3/1990 | Sherman | |
| 4,921,702 | A | 5/1990 | Banks | |
| 4,921,703 | A | 5/1990 | Higucha | |
| 4,953,506 | A | 9/1990 | Sanders | |
| 4,966,099 | A | 10/1990 | Arney | |
| 4,971,276 | A | 11/1990 | Tannenbaum | |
| 5,036,799 | A | 8/1991 | Jordan et al. | |
| 5,042,192 | A | 8/1991 | Osteen | |
| 5,088,233 | A | 2/1992 | Frankenbery | |
| 5,104,659 | A | 4/1992 | Fishbein | |
| 5,125,363 | A | 6/1992 | McGaha | |
| 5,142,734 | A | 9/1992 | Looman | |
| 5,142,817 | A | 9/1992 | Rolf | |
| 5,148,626 | A | 9/1992 | Haake, Sr. | |
| 5,159,778 | A | 11/1992 | Metzner | |
| 5,165,365 | A | 11/1992 | Thompson | |
| 5,176,465 | A | 1/1993 | Holsted | |
| 5,191,676 | A | 3/1993 | Gerner | |
| 5,194,265 | A | 3/1993 | Boettcher | |
| 5,224,288 | A | 7/1993 | Skelton | |
| 5,253,609 | A | 10/1993 | Partelow et al. | |
| 5,274,950 | A | 1/1994 | Roberts | |
| 5,277,149 | A | 1/1994 | East | |
| 5,351,629 | A | 10/1994 | Breezer | |
| 5,353,556 | A * | 10/1994 | Hand et al. | 52/101 |
| 5,381,959 | A * | 1/1995 | Malkin | 239/201 |
| 5,392,559 | A * | 2/1995 | Long | 43/121 |
| 5,414,954 | A | 5/1995 | Long | |
| 5,440,833 | A | 8/1995 | Stoll | |
| 5,467,738 | A | 11/1995 | Cass | |
| 5,513,577 | A | 5/1996 | Weis | |
| 5,596,834 | A | 1/1997 | Ritter | |
| 5,603,266 | A | 2/1997 | Nash | |
| 5,619,952 | A | 4/1997 | Walker | |
| 5,641,499 | A | 6/1997 | Bencsits | |
| 5,649,492 | A | 7/1997 | Chin-Shu | |
| 5,661,925 | A | 9/1997 | MacMaster | |
| 5,794,564 | A | 8/1998 | Paro | |
| 5,809,689 | A | 9/1998 | Mathur | |
| 5,819,468 | A | 10/1998 | Jollie | |
| 5,850,797 | A | 12/1998 | Hunicke | |
| 5,855,185 | A | 1/1999 | Scott | |
| 5,857,428 | A | 1/1999 | Gitzen | |
| 5,881,671 | A | 3/1999 | Riedl | |
| 5,918,411 | A | 7/1999 | Hadrava | |
| 5,927,024 | A * | 7/1999 | Toutountzis et al. | 52/101 |
| 5,943,815 | A | 8/1999 | Paganessi | |
| 5,996,531 | A | 12/1999 | Anderson | |
| 6,003,724 | A | 12/1999 | Collins et al. | |
| 6,024,048 | A | 2/2000 | Potente | |
| 6,058,661 | A * | 5/2000 | Hand et al. | 52/101 |
| 6,061,974 | A | 5/2000 | Perrigo | |
| 6,065,428 | A | 5/2000 | Fronk | |
| 6,068,234 | A | 5/2000 | Keus | |
| 6,125,790 | A | 10/2000 | Breedwell | |
| 6,155,527 | A | 12/2000 | Muyskens | |
| 6,167,840 | B1 | 1/2001 | White et al. | |
| 6,230,435 | B1 * | 5/2001 | Carman | 43/108 |
| 6,378,242 | B1 | 4/2002 | Roberts | |
| D475,817 | S * | 6/2003 | Heyek | D30/199 |
| RE38,182 | E * | 7/2003 | Nylen et al. | 119/52.3 |
| 6,779,311 | B1* | 8/2004 | Roberts | 52/101 |

FOREIGN PATENT DOCUMENTS

| | | |
|---|---|---|
| DE | 198 31 952 A1 | 6/1999 |
| FR | 358263 B1 | 12/1905 |
| FR | 2638058 A1 | 4/1990 |
| GB | 16409 B1 | 7/1910 |
| GB | 372563 | 5/1931 |
| GB | 647301 B1 | 12/1950 |
| JP | HEI3-10632 | 1/1991 |
| WO | WO 00 00015 A | 1/2000 |

* cited by examiner

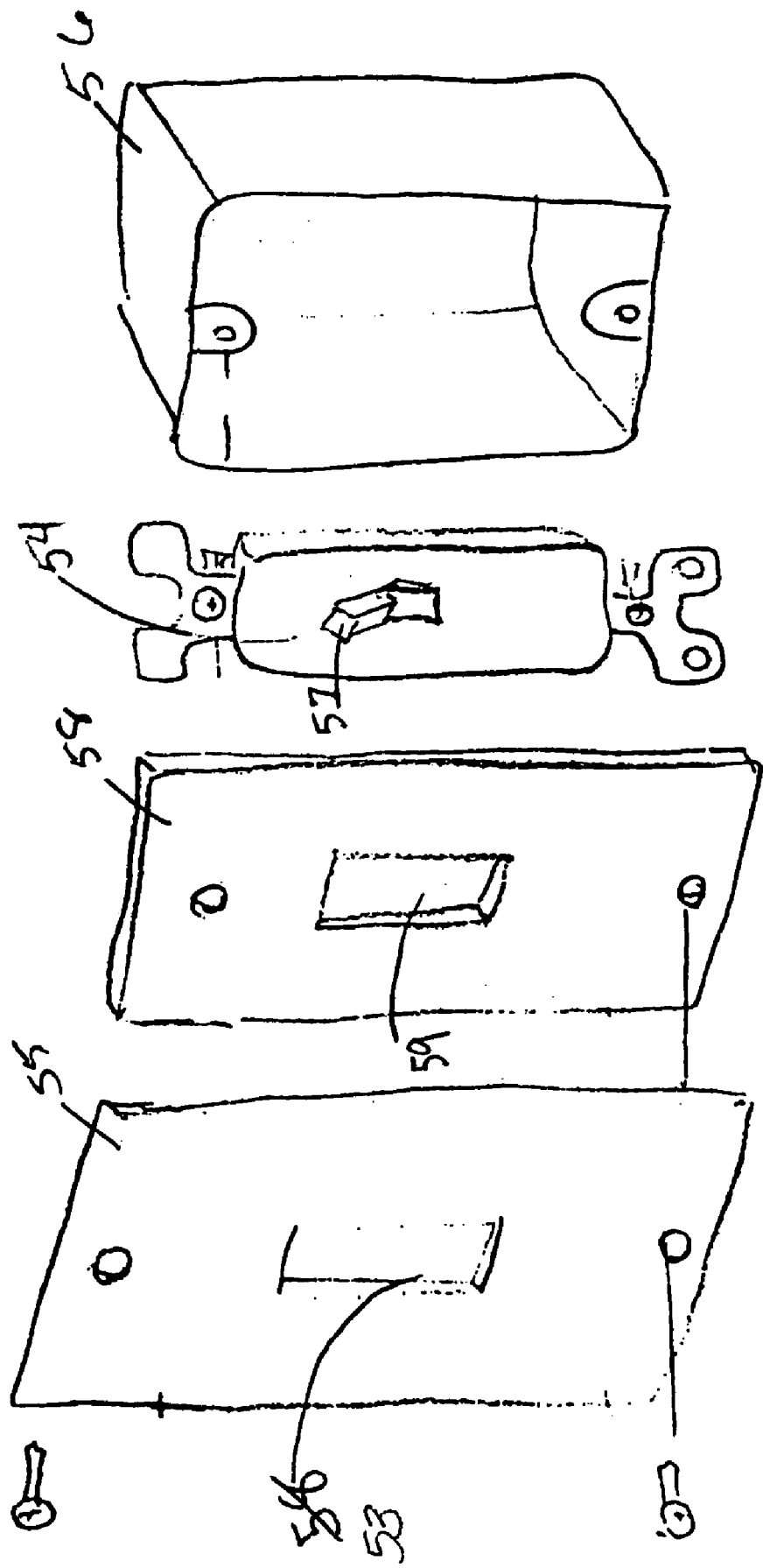

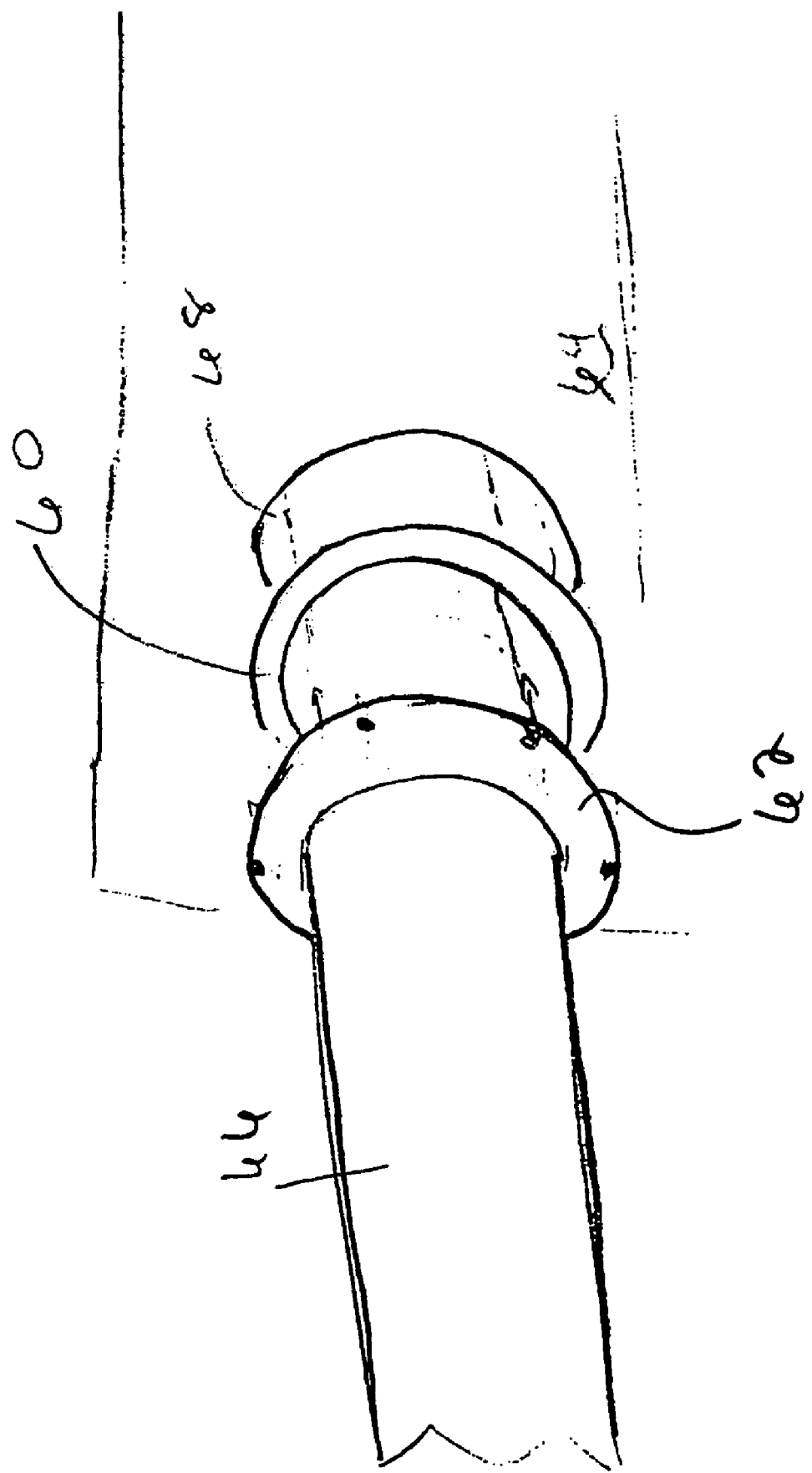

US 7,024,826 B2

DEVICE FOR IMPEDING A ROUTE OF TRAVEL OF CRAWLING ARTHROPODS

This is a Divisional of application Ser. No. 09/750,831 filed Dec. 28, 2000 now U.S. Pat. No. 6,837,008.

This application claims priority from U.S. Provisional Application Ser. No. 60/181,395, filed Feb. 9, 2000.

BACKGROUND OF THE INVENTION

The present invention is directed to the art of pest control, and more particularly to the art of barriers for impeding route of travel of crawling arthropods at point source, point of entry. It serves as a novel technology in integrated pest management (IPM). The invention is particularly applicable to barriers for interrupting a route of travel of crawling arthropods along passageways that lead to partially enclosed or partially exposed spaces, and may be advantageously employed in these and other environments.

Ants and other crawling arthropods pose a problem to electrical or lighting wall work boxes, pipe flanges, fluid dispensing and intake passageways, enclosed utility boxes, heating, ventilating and air conditioning ports, and other enclosed or partially enclosed vias accessible to the pests. They are also undesirable in living areas, and are known to crawl up support structures to reach beds, table tops, racks and the like.

In agricultural areas where irrigation is used, ants tend to make their way into the tiny microjets that extend from the water feed line. The ants bring sand, dirt, food and other substances with them as they enter the jets. They also leave fecal matter. The fine microjets become clogged, and the flow of water therefrom becomes interrupted such that irrigation is interrupted. The jets must then be cleaned out or replaced on a frequent basis.

In another example, crawling insects that are inside walls or utility passageways often invade interior spaces, such as residential living areas or commercial rooms, by entering through utility wall plates. This is particularly the case in warmer climates or nesting areas in all climates. It is not uncommon for ants to enter into a room via the openings for receptacles and switching outlet components or electrical sockets. Also, if there is a gap between the wall and wall plate, the ants can foreseeably crawl through the gap into the room. They can also crawl into a room through openings defined by plates for cable wires, light switches, blank plates, and the like.

Pipe flanges and other articles that cover openings in walls provide another area where arthropods find access into a room or into a wall. The arthropods or ants crawl behind the flanges or plates, through pipe cracks or through pipe openings covered by flanges, or gaps between the wall and plumbing pipes.

Arthropods pose a serious problem for the microjets and other passageways, vias or enclosed or partially enclosed spaces attractive to such crawling insects. They clog passageways and spread diseases. They are considered a health hazard. Certain insects, such as red fire ants and Argentine ants, tend to sting humans, some to such a great extent to cause grave injury or even death. It is desirable to find a solution or an answer to these critical needs and to develop a way to prevent the arthropods from entering and clogging microjets and other vias. It is further desirable to develop a procedure for eliminating or dramatically reducing the passageway of the crawling arthropods into residential as well as non-residential spaces. Finally, it is desirable to develop an implement and method to obstruct a route of travel of crawling arthropods along an exposed, enclosed, or partially enclosed passageway.

The present invention provides for a novel barrier implement and method for obstructing a route of travel of crawling arthropods that is safe, economical, and durable and provides a solution to the critical needs in integrated pest management.

SUMMARY OF THE INVENTION

In accordance with the present invention, there is provided a barrier for separating ants and other crawling arthropods and vermin from a point or area where they are undesired. A method for impeding a route of travel of crawling arthropods is also provided.

A barrier implement intended for obstructing a route of travel of crawling arthropods along a passageway comprises a sheet material adapted to circumscribe the passageway along which arthropods crawl. A dimension of the sheet is sized relative to the passageway. An arthropod deterring component is associated with the sheet material to deter crawling arthropods and impede their route of travel along the passageway.

A method of impeding a route of travel of crawling arthropods from a location A to a location B along a passageway is also provided. A sheet is positioned between the two locations. An arthropod deterring component is associated with the sheet. The sheet circumscribes the passageway, and a dimension of the sheet is sized relative to said passageway. An arthropod impervious barrier is created between location A and location B to impede a route of travel of crawling arthropods from moving from location A to location B is impeded.

A principal advantage of the present invention is that the barrier implement can be retrofit to existing standard equipment. It provides an economical solution to a widespread insect problem.

Another advantage of the present invention is that it falls within the recent mandate to reduce the broadcasting of pesticide chemicals.

Another advantage of the present invention is that the barrier device serves a dual purpose. It deters a route of travel of crawling arthropods. It also reduces or eliminates the infiltration of air or drafts that flows through electrical boxes, wall plates, pipe flanges and the like.

Yet another advantage of the invention is found in its duration. The implement can be applied and kept in place for up to several years. After the barrier implement loses its effectiveness, a new barrier implement can be readily installed to replace the old.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof.

FIG. 3 shows a barrier adapted for installation behind a switch plate;

FIG. 4 shows a barrier implemented for use in association with a flange;

DETAILED DESCRIPTION OF THE INVENTION

Figure 1A:
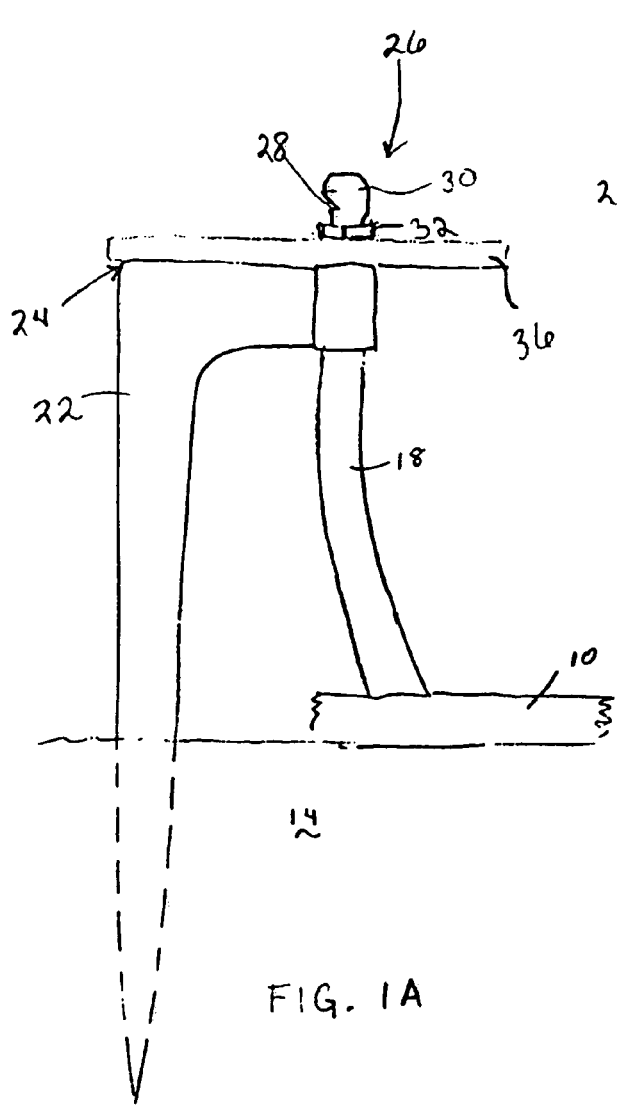
FIG. 1A discloses a barrier implement installed about an elongated structure in an irrigation microjet environment.

Referring now to the drawings where the showings are made for the purpose of illustration only and are not for the purpose of limiting same, the Figures set forth examples of environments in which a barrier implement for impeding a route of travel of crawling arthropods is useful. The implement is useful in connection with blocking progression of arthropods crawling along passageways, whether the passageways be elongated or abbreviated in length, enclosed or exposed. The implement is designed to surround or circumscribe a given passageway such that it obstructs the crawling arthropod from proceeding between a location A and a location B along said passageway. These two locations generally comprise areas on either side of an installed barrier implement.

The barrier implement is comprised of any impregnable material or any material to which an arthropod deterring constituent could be superficially applied or impregnated. In a preferred embodiment, the sheet is comprised of a pliable polymer material into which an arthropod deterring component can be molded. But the material need not necessarily be pliable. The barrier implement can also be composed of a stiff or rigid material. The implement can be molded to be a circular, rectangular or any other shape disk, or it can be molded to virtually any configuration to fit or conform and adapt to any virtually surface orientation. For example, the disk can be shaped as a circle, square, angular, rectangular, as a wafer, a flap, gasket, washer, sheet, plate, shelf, leaf, thimble, coat, grommet, foil, membrane or virtually any configuration. It can be flat, concave, convex or embossed. It can be molded or extruded to fit any surface or embodiment to cause interruption of arthropod travel from point to point. Its purpose is to interrupt a route of crawling arthropod travel. It employs point source technology in that it stops or deters crawling arthropods at the source of the problem. It also responds to critical needs in integrated pest management.

An active ingredient in the nature of an arthropod deterring component is associated with the barrier material. The component can be molded directly in the barrier material, or it can be applied to the surface by painting it on or by inserting or installing a cartridge thereon. Preferably, the component is a pesticide such as permetherin which can be molded directly in the sheet. Another pesticide or other type of arthropod deterring constituent, which may or may not comprise a pesticide, is contained in, applied to or molded directly in the barrier material composition. In some instances, a slippery substance, such as polytetraflurorethylene (Teflon) coating or petroleum jelly applied to the barrier material, will suffice to deter the crawling arthropods from proceeding along the passageway. The barrier serves the purpose of acting as a shield or barrier to prevent the ingress of arthropods into ports or enclosed or semi-enclosed spaces where pests are not desired, or even past certain points on flat or elongated structures.

Figure 1B:
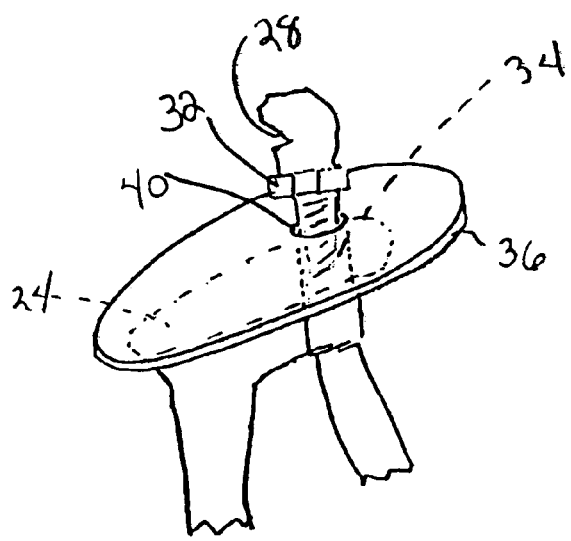
FIG. 1B provides a detailed perspective view of the barrier implement of FIG. 1A in the irrigation microjet environment.

An example of an environment where the barrier implement is useful is provided in FIGS. 1A and 1B. Here, the barrier implement provides a deterring effect along an elongated passageway, in this particular case an external surface of a microjet capillary. An irrigation water line 10 travels along the ground 14. The water line is shown broken away to indicate that it extends linearly in both directions. A thin diameter microjet capillary or flex tube 18 branches off the water line and is supported in a generally upward position by a stake 22 that is stationed in the ground. An upper end 24 of the stake is designed to hold or support the flex tube 18 in place. A microjet assembly 26 is in place at the distal end of the capillary or flex tube 18. Water flows from water line 10 through capillary 18 and out through an opening 28 defined in a head portion 30 of the assembly. It is to be understood that the microjet assembly exemplified in FIGS. 1A and 1B includes a threaded tube which extends downward from the head, through hex nut 32. The threaded tube is received within an internally threaded end 34 of capillary 18.

The removable nature of the microjet assembly enables the installation of a barrier implement 36. The barrier itself comprises a disk shaped sheet that is fashioned to enable an elongated or other type object pass therethrough. Here, the sheet is provided in a circular configuration, though virtually any configuration will suffice. The thickness of the sheet should be such that it can be accommodated in the environment. The sheet disclosed in FIGS. 1A and 1B is less than approximately 1/16" in thickness, but this is not intended to be a limiting dimension. The sheet thickness is preferably substantially even, but is not required to be even.

An opening 40 defined in the sheet is adapted to circumscribe an elongated or other structure therethrough. Here, the opening is sized to accommodate the capillary tube 18. The barrier disk is held in place on the tube by passing threads from the microjet assembly through it and securing it in place by joining the assembly to the capillary and holding it in palace by the pressure of the hex nut.

An arthropod deterring component is associated with the disk. The disk and arthropod deterring component together act as a barrier and a deterrent to prevent the crawling arthropods from passing through to the tiny microjet openings. As the arthropods crawl upward along the support member or the tube, they approach the disk. The arthropod deterring component associated with the disk deters them from continuing along their path.

FIG. 1B shows A detailed view of the microjet assembly. Ants or other arthropods are known to crawl into the microjet opening 28 when the jets are not in use. Microjets are typically used minimally, often only once per day, in order to conserve water. When the jets are not in use, the ants crawl in through the opening to seek out moisture, particularly in dry and arid situations. They bring sand, dirt, and food with them. This clogs the microjets, which then significantly disrupts the irrigation flow.

Ants and other crawling arthropods are prevented or deterred from entering the microjets by placing a disk 36 that embodies an arthropod deterring agent around the threads of the microjet, just below the opening 28. The disk extends to overhang the width of the capillary and is shown to rest on the top 24 of the stake 22. Ants that would have to crawl up the stake or flex tube to reach the microjet opening or port 28 are deterred by the arthropod deterring agent embodied in the disk. They must encounter the disk before they can proceed to the opening.

Figure 2:
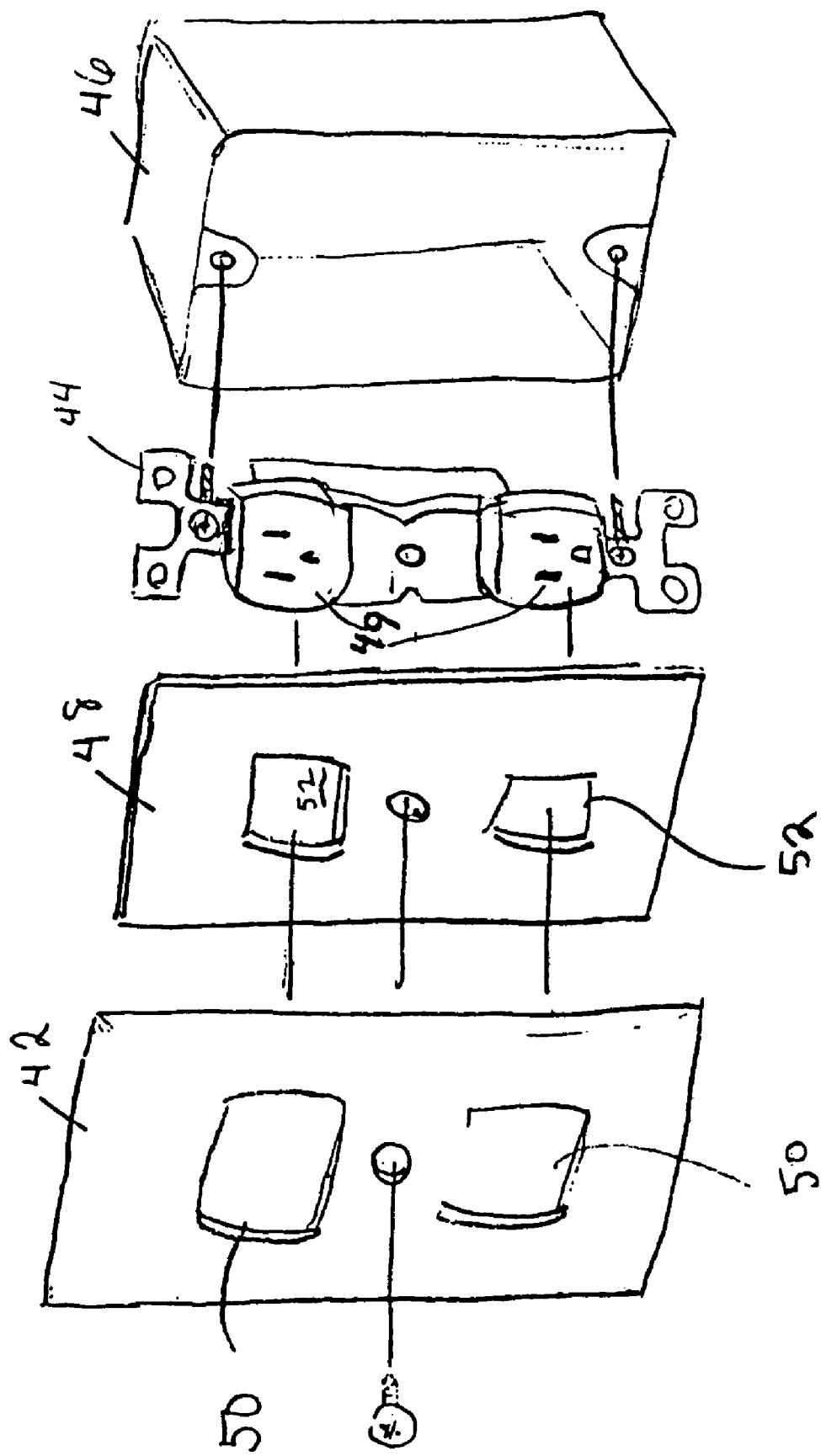
FIG. 2 shows a barrier implement adapted for installation behind a utility wall receptacle, namely, an outlet wall plate.

Another example of an environment in which the vermin deterring component can be used is shown in FIG. 2. It is understood that the utility wall plate environment of FIG. 2 includes a wall plate 42, electrical socket 44, socket box 46 and barrier implement 48. As is traditional, the socket box is mounted inside a wall and is situated to hold an electrical socket in place therein. It is understood that the outlets 49 are exposed outside the wall via openings 50 within the wall plate. Barrier sheet 48 is configured to fit within an underside of the wall plate. When installed, it is sandwiched, at least about or near its periphery, between the wall plate and a wall. The barrier sheet is configured to define openings 52 therein for receiving or exposing electrical sockets therethrough. The sockets are exposed through the barrier implement and the wall plate 42.

Barrier implement shown in FIG. 2 also acts as an insulator while it keeps arthropod infestation down. As will be noted, sheet 48 is designed to fit inside a utility wall plate 42 to obstruct a route of travel of crawling arthropods. In many climates, there is a problem in that crawling arthropods tend to invade a room by entering through an opening made by a utility wall plate 42. The sheet defines openings 52 that correspond to openings 50 in the wall plate 42 which are adapted to receive an electrical socket therethrough.

Arthropods can also escape into a room through any gaps that are formed between a wall plate and a wall. The barrier implement is designed to prevent the escape of ants or other arthropods through such gaps.

The sheet itself is configured to correspond to the size and shape of the wall plate. Generally, two opposing sides of the wall plate sheet are substantially equal in size. The sheet can be configured to agree to the shape and purpose of the wall plate. For example, the wall plate shown in FIG. 2 is designed to cover a double electrical outlet. If there were two additional outlets under the plate, then the sheet would be designed to include those added outlets by including two additional holes.

A similar situation is identified in FIG. 3 where a light switch 54 is shown. It is understood that this environment includes a switchplate 55, the switch 54, socket box 56 and barrier implement 58. The socket box 56 is recessed inside a wall and is adapted to hold the switch therein. It is understood that the toggle switch 57 is exposed outside the wall via opening 53 in the switchplate. The barrier implement 58 is configured to fit within an underside of the switchplate and, during installation, is at least sandwiched between the switchplate and the wall. A periphery of the barrier 58 and portions inward therefrom is mounted flush to a wall. Opening 59 is defined in the switchplate barrier 58 to receive or expose the toggle switch 57 therethrough.

The barrier implement can be configured to virtually any shape or size. Another example of a useful barrier is shown in FIG. 4. A barrier implement 60 is adapted to fit between a flange 62 and wall 64. By way of example, a pipe 66 is shown as extending outward from said wall. Crawling arthropods that seek to enter a room by any gaps left by an installed pipe or conduit or the like are impeded by placement of the ring-shaped disk 60 behind the flange 62. Gaps are often left between an opening in a wall 68 and a pipe or conduit. The disk is a sheet of material impregnated with an arthropod deterring component to interrupt a route of travel of the crawling arthropods from within a wall or behind a wall into a room.

Barrier implements can be configured to correspond to other types of flanges including those from conduit, cable, dryer units and the like.

The barrier of FIGS. 2, 3 and 4 serves an added benefit in that it reduces or eliminates drafts or air flow through openings in walls which are not adequately, insulated by pipes or flanges. After a time, the barrier implement can be recharged with a deterring component, or it can be easily discarded and replaced.

Figure 5A:
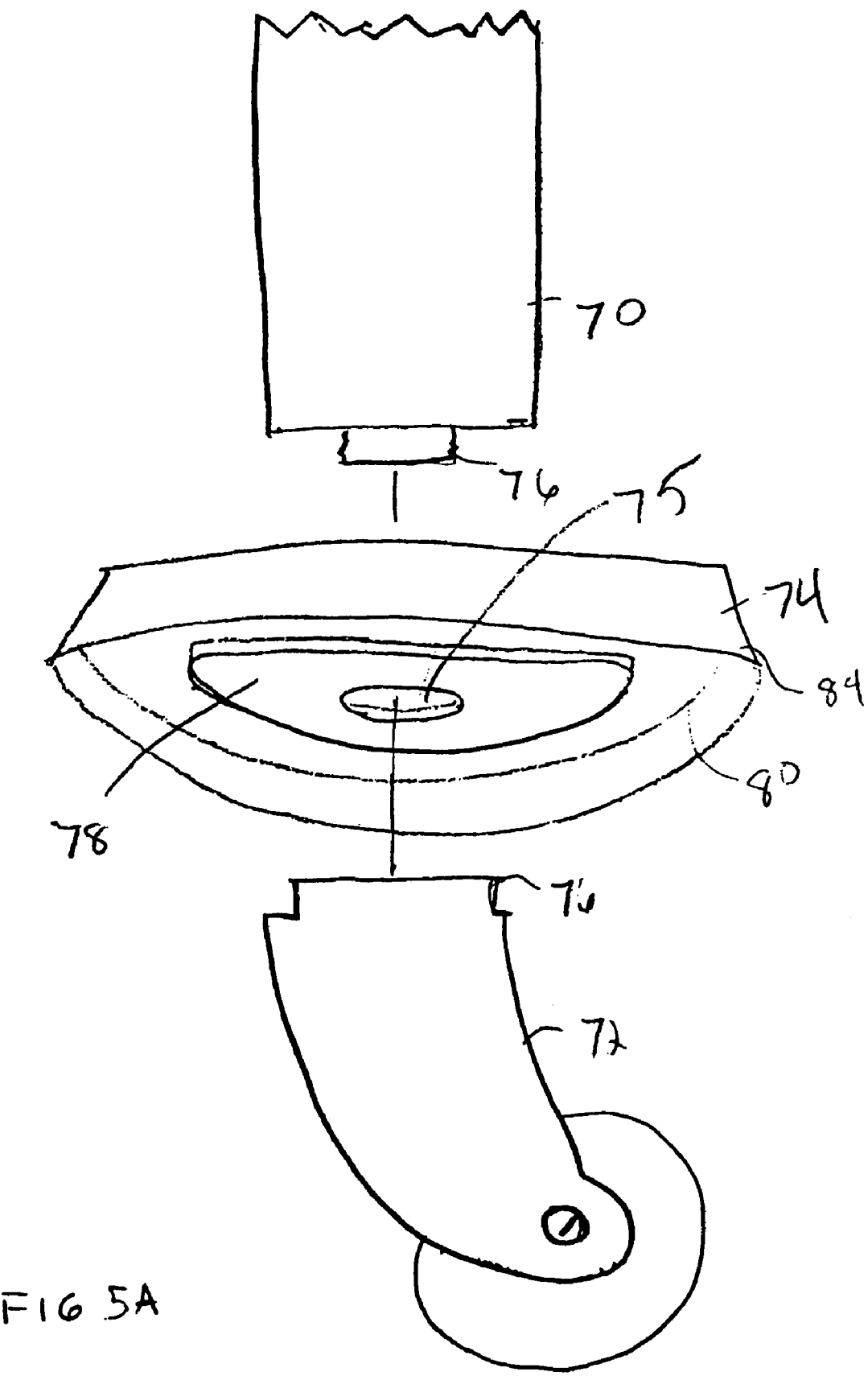
FIG. 5A sets forth an exploded view of a barrier implement situated in an environment that includes a caster and a coaster disk.
Figure 5B:
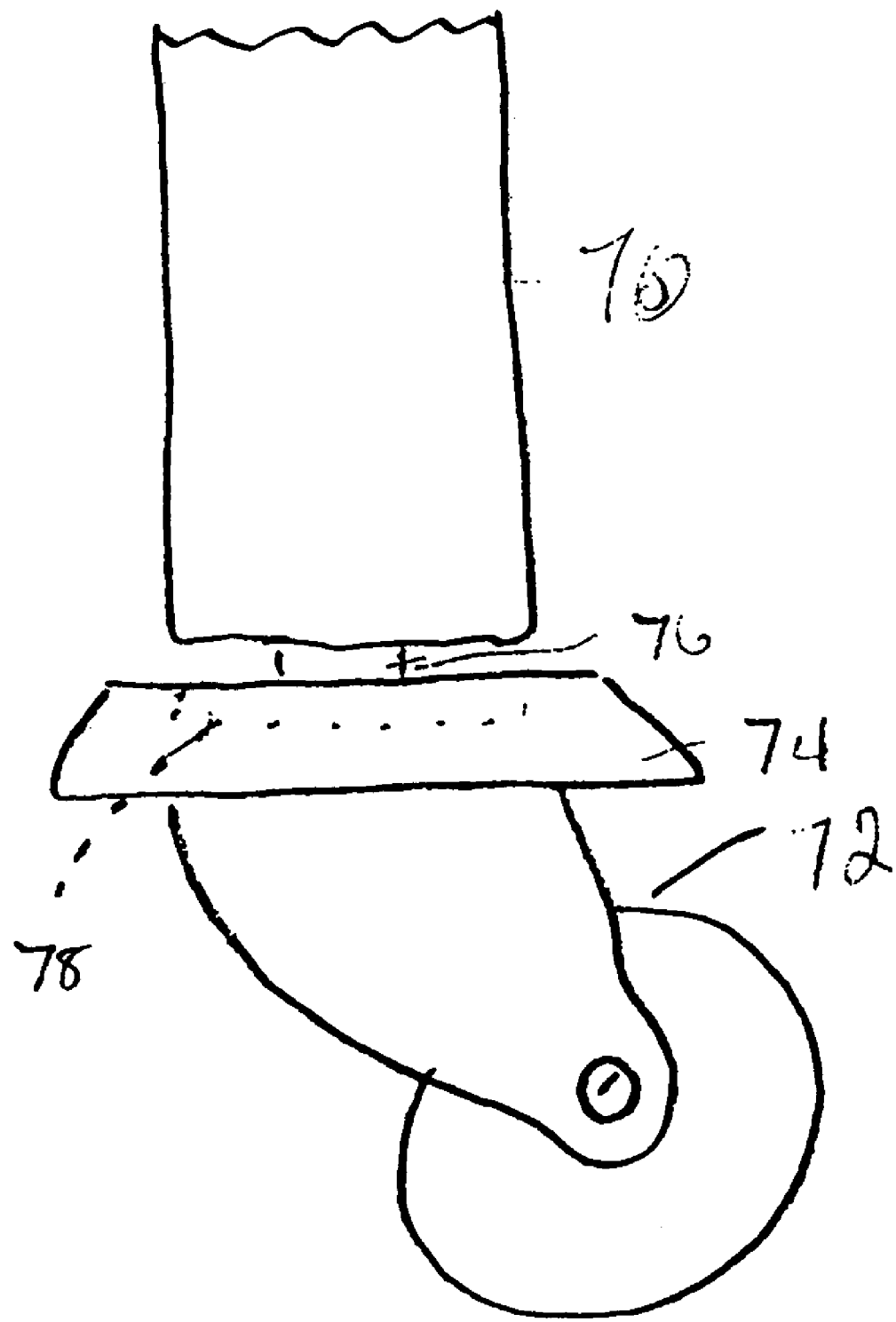
FIG. 5B displays an assembled view of a caster, furniture leg and a coaster disk which holds the barrier implement in place and also provides a shield for the barrier.

Another useful environment for the barrier implement is shown in FIGS. 5A and 5B. Here, a leg 70 supported by a caster 72 is shown. A coaster disk 74 defines an opening 75 for receipt of the leg therethrough. The leg can be for furniture or movable storage racks and all units supported by casters, where crawling insects are a problem. These include racks used in health care, food storage, laboratories or any other rolling structure supported by casters. Caster joining components 76 are received through opening 75 to position the coaster in place. The coaster acts as a receptacle for a barrier implement 78 which is clinglingly or otherwise mounted into the coaster. The barrier implement defines an opening that matches the coaster opening 75. The coaster provides a shielding function for the barrier so that when it is in place the barrier is not in plain view of persons and is not easily touched by persons. It is foreseeable that the barrier device could be installed on a leg without the need for a coaster. The coaster provides one example of a shield for a barrier device. In this instance, the shield includes a barrier wall 80 with a rim 84. It is to be understood that the rim could be angled outwardly or flared, as shown, or perpendicular to the barrier wall 80. It is further understood that a return can be present at a bottom of the rim to minimize a gap between the caster and the coaster. The shield is composed of an inert material. The barrier shown in FIGS. 5A and 5B serves to prevent arthropods from crawling along a passageway formed from furniture legs and casters.

This invention is not limited to the sheets disk shown in the Figures. Nor is it limited to the microjet, the wall plates, the flanges, or the furniture/caster environments shown in the figures. The situation shown in the figures is merely by way of example. The device of the present invention is fully adaptable to virtually any enclosed or partially enclosed area where it is desirable to eliminate ants, roaches and other crawling arthropods by stopping their route of travel from point to point. Examples of where the barrier device of the present invention can be used include irrigation systems, electrical systems, heating and air conditioning systems, agricultural equipment, table or cart on legs, adjacent casters (indoors or outdoors), or any other situation where crawling pests pose a problem. The list is non-inclusive and is intended to include adaptability of the device to virtually any environment in any configuration to aid in the stopping of travel of arthropods from point to point.

The barrier can likewise be used with virtually any fluid dispensing or intake apparatus, any conduit, any enclosed or semi enclosed area where arthropods are not desired. Examples include, but are not limited to, use in utility boxes, junction boxes, at the end of hoses, electrical conduits inside tubes, outside tubes, at HVAC ports, or virtually anywhere that arthropods may crawl. The barrier device can be of virtually any configuration, and is molded to conform to the shape of the object to which it will be attached. It acts as a barrier, an exclusion device, a destruction device, blockade, impediment, or partition. It stops, kills or inhibits the route of travel from point to point of crawling arthropods. The device shields an enclosed or partially enclosed space from the crawling vermin. The vermin are prevented from crawling along the passageway from location A, which is defined as their source or the portion of passageway that leads from the source, to location B, which is defined as the area where arthropods are undesired or a portion of passageway which leads to that area.

The barrier is readily removable and can be replaced with another if the arthropod deterring constituent or active ingredient should become ineffective or depleted. In the alternative, it can have a protective cover or shield to protect against dermal contact.

The invention has been described with reference to the preferred embodiment. Obviously modifications and alterations will occur to others upon a reading and understanding of this specification. It is intended to include all such modifications and alterations insofar as they come within the scope of the appended claims or the equivalent thereof.

We claim:

1. A barrier implement for obstructing a route of travel of crawling arthropods for a water irrigation head used in an outside watering device, comprising:
   a flexible sheet of material adjacent to the water irrigation head, the sheet including an opening for allowing the water irrigation head to protrude therethrough; and
   arthropod deterring component associated with said sheet for deterring crawling arthropods and impeding their route of travel to the water spray head;
   a stake and hose assembly for supporting the sheet above a ground surface so that the sheet is located between a water irrigation head and the ground surface;
   a threaded portion on the support member beneath the water irrigation head; and
   a nut for screwing about the threaded portion, wherein the nut holds the sheet in position.

2. The barrier implement of claim 1, wherein the water irrigation head includes:
   a microjet.

3. The barrier implement of claim 1, wherein the arthropod deterring component includes: an arthropod deterring agent embodied in the sheet.

4. The barrier implement of claim 3, wherein the arthropod deterring agent includes: a pesticide.

5. The method of claim 1, wherein the positioning step includes:
   positioning the sheet between the water irrigation head and a ground surface.

6. The method of claim 5, further comprising:
   supporting the sheet above the ground surface.

7. A method of deterring crawling arthropods from reaching a water irrigation head, comprising the steps of:
   positioning a sheet adjacent to the water irrigation head, the positioning step including the step of holding the sheet to a support member with a nut on a threaded shaft, so that the sheet is between the water irrigation head and the support member;
   applying an arthropod deterring component to the sheet; and
   preventing the crawling arthropods from reaching the water irrigation head by the sheet with the arthropod deterring component.

8. The method of claim 7, wherein the positioning step includes:
   protruding the water irrigation head through an opening in the sheet.

9. The method of claim 7, wherein the applying step includes:
   embodying an arthropod deterring agent to the sheet.

10. The method of claim 9, wherein the embodying step includes:
    applying a pesticide to the sheet.

11. An arthropod deterring assembly for water irrigation heads, comprising in combination:
    a water irrigation head raised above a ground surface;
    a sheet between the head the ground surface; and
    an arthropod deterring material associated with the sheet for deterring crawling arthropods from reaching the water irrigation head; and
    a threaded shaft with nut for holding the sheet above the ground surface.

12. The assembly of claim 11, wherein the sheet includes:
    a gasket shape having a through-hole for allowing the water irrigation head to protrude therethrough.

13. The assembly of claim 11, wherein the arthropod deterring material includes: a pesticide.

* * * * *